United States Patent [19]
Ritter

[11] Patent Number: 4,720,119
[45] Date of Patent: Jan. 19, 1988

[54] STEERING SYSTEM FOR A FOUR-WHEELED TRAILER

[76] Inventor: Russell H. Ritter, 2707 Forest Grove, Wyoming, Mich. 49509

[21] Appl. No.: 919,384

[22] Filed: Oct. 16, 1986

[51] Int. Cl.$^4$ ............................................. B60D 1/00
[52] U.S. Cl. ..................................... 280/443; 280/419
[58] Field of Search ............... 280/419, 426, 442, 443, 280/444, 445

[56] References Cited

U.S. PATENT DOCUMENTS 4,405,147  9/1983  Horsman et al. ................... 280/442
4,451,058  5/1984  Curry ................................... 280/443

Primary Examiner—John J. Love
Assistant Examiner—Donn McGiehan
Attorney, Agent, or Firm—Glenn B. Morse

[57] ABSTRACT

A four-wheeled freight trailer adapted particularly to farm use has its front axle beam fixed with respect to the frame of the trailer, and has steerable wheels at the opposite ends of this beam. The tongue of the trailer is fixed with respect to the frame against rotation on a vertical axis. A crank arm on the front of the tongue engages an abutment on the hitch of a towing vehicle, so that turning the vehicle induces rotation of the crank arm which actuates a steering linkage connected to the front wheels of the trailer.

6 Claims, 7 Drawing Figures

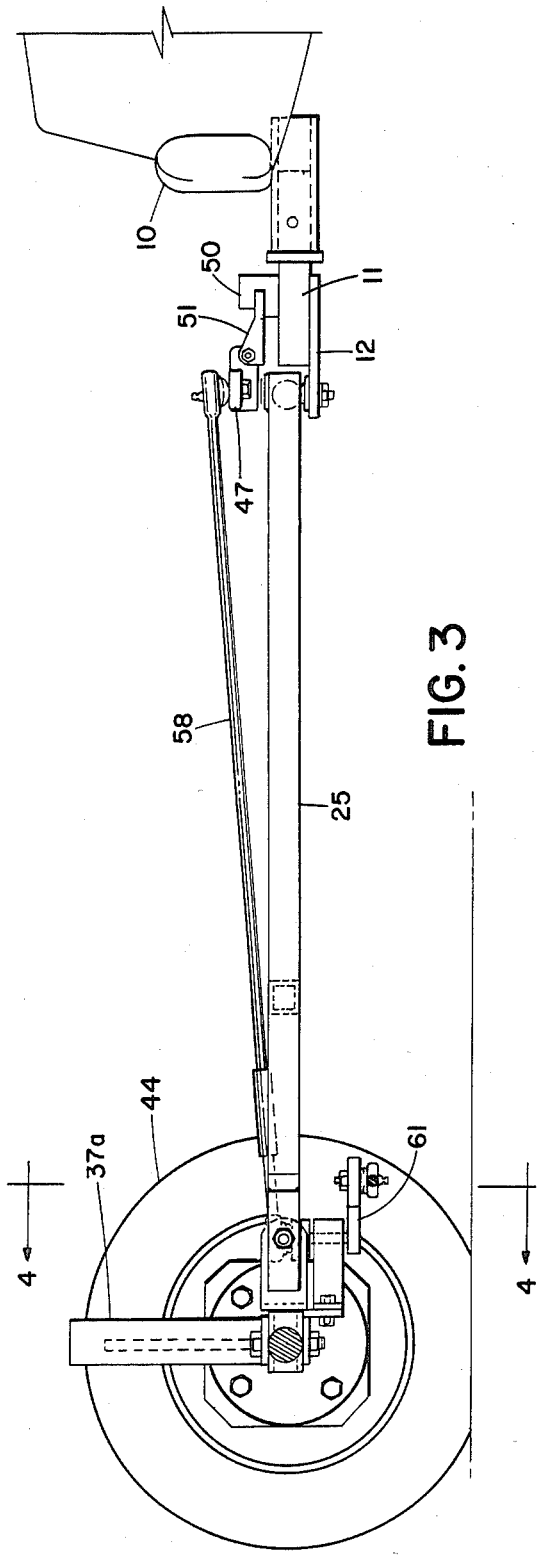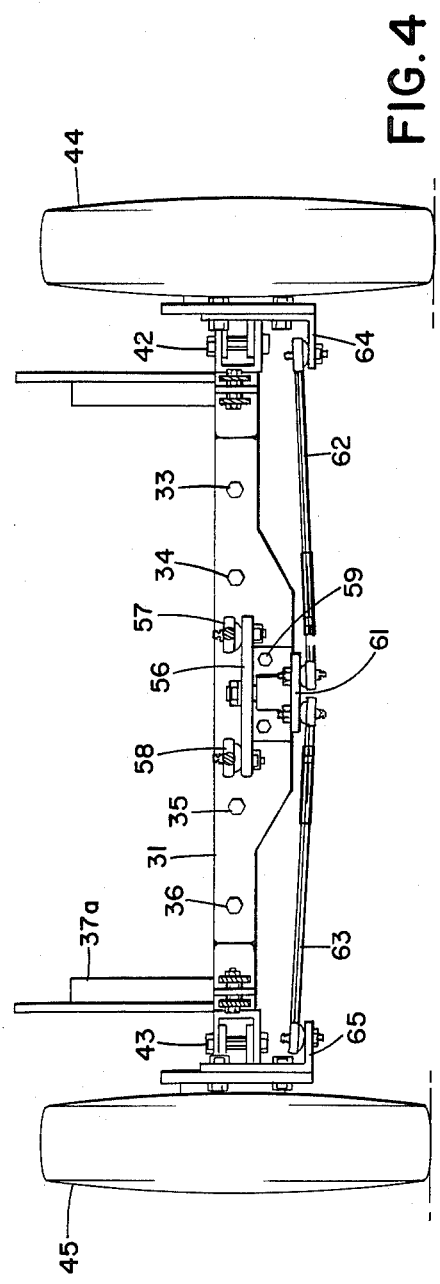

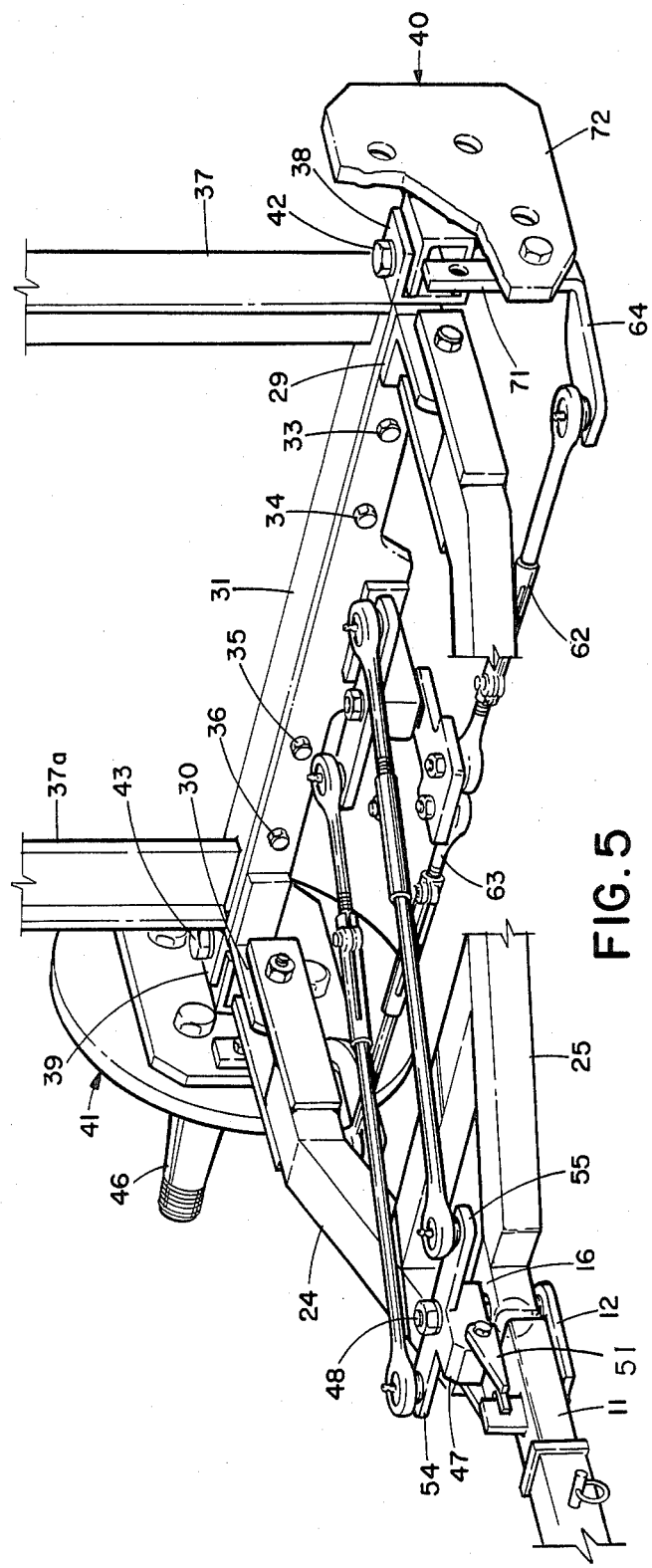
FIG. 5
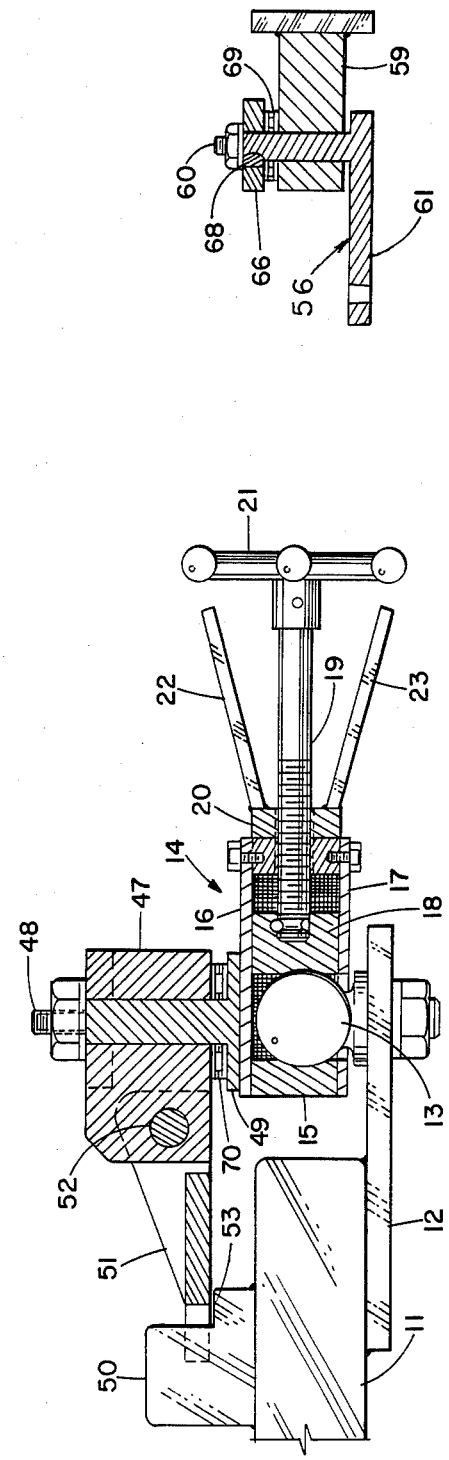
FIG. 7
FIG. 6

STEERING SYSTEM FOR A FOUR-WHEELED TRAILER

BACKGROUND OF THE INVENTION

Four-wheeled trailers are usually steerable with either of two systems. The first of these is associated with the old Conestoga wagons, in which the front axle beam is fixed with respect to the tongue, with this T-shaped configuration being centrally pivoted to the front of the wagon or trailer. As the towing vehicle connected to the front portion of the tongue turns, it carries the tongue along with it. In effect, the combination of the tongue and the front axle (together with its wheels) forms a separate trailer to which the frame of the wagon or trailer and its rear wheels becomes almost a second trailer. The other steering system involves a front axle beam fixed with respect to the bed of the trailer, with steerable wheels mounted at the opposite ends of the beam. In the usual configuration, the tongue is pivotally connected to the frame of the trailer, and a linkage extends laterally from the rear portion of the tongue out to the steering arms associated with the wheels, so that a lateral shifting of the tongue in response to a turn by the towing vehicle is communicated to the steerable wheels. Both of the systems outlined above have a characteristic dynamic instability at highway speeds. Without extensive modification, these trailers develope a nasty tendency toward a weaving instability commonly referred to as "fish-tailing". This erratic behavior can easily cause the trailer to swing well out of its normal lane of travel, and can even proceed to the point where the trailer is destroyed by the violence of the swinging movement. Obviously, this problem is aggravated in cases where the trailer is stacked high with freight.

SUMMARY OF THE INVENTION

This trailer has a tongue structure that is fixed with respect to the bed frame against articulation about a vertical axis. The hitch member of the towing vehicle is provided with an abutment extending vertically at a position spaced somewhat from the axis of the ball coupling. This abutment is engaged by a crank member pivoted at or near the coupling axis, and this crank member has a lateral arm carrying a link extending to the rear of the tongue structure. This link is connected to a corresponding lateral arm on a crank member that also has an arm extending in a front-rear direction. This latter arm actuates links extending out to the conventional steering arms associated with the steerable wheels at the opposite ends of the axle beam. Appropriate proportioning of the links of the various crank arms, and placement of the pivot axes, results in the steerable wheels following the turn established by the towing vehicle. The following articulation of the front wheels is almost that of a castering system, without the associated instability. The result of this structure is to eliminate the dynamic instability of the trailer.

DESCRIPTION OF THE DRAWINGS

FIG. 3 is a side elevation of the structure shown in FIGS. 1 and 2.

FIG. 4 is a section on the transverse vertical plane 4—4 of FIG. 3.

FIG. 5 is a perspective view of the steering system.

FIG. 6 is a section on an enlarged scale through the hitch assembly.

FIG. 7 is a section on an enlarged scale through the central pivot structure shown in FIG. 5.

DESCRIPTION OF THE PREFERRED EMBODIMENTS

Figure 1:
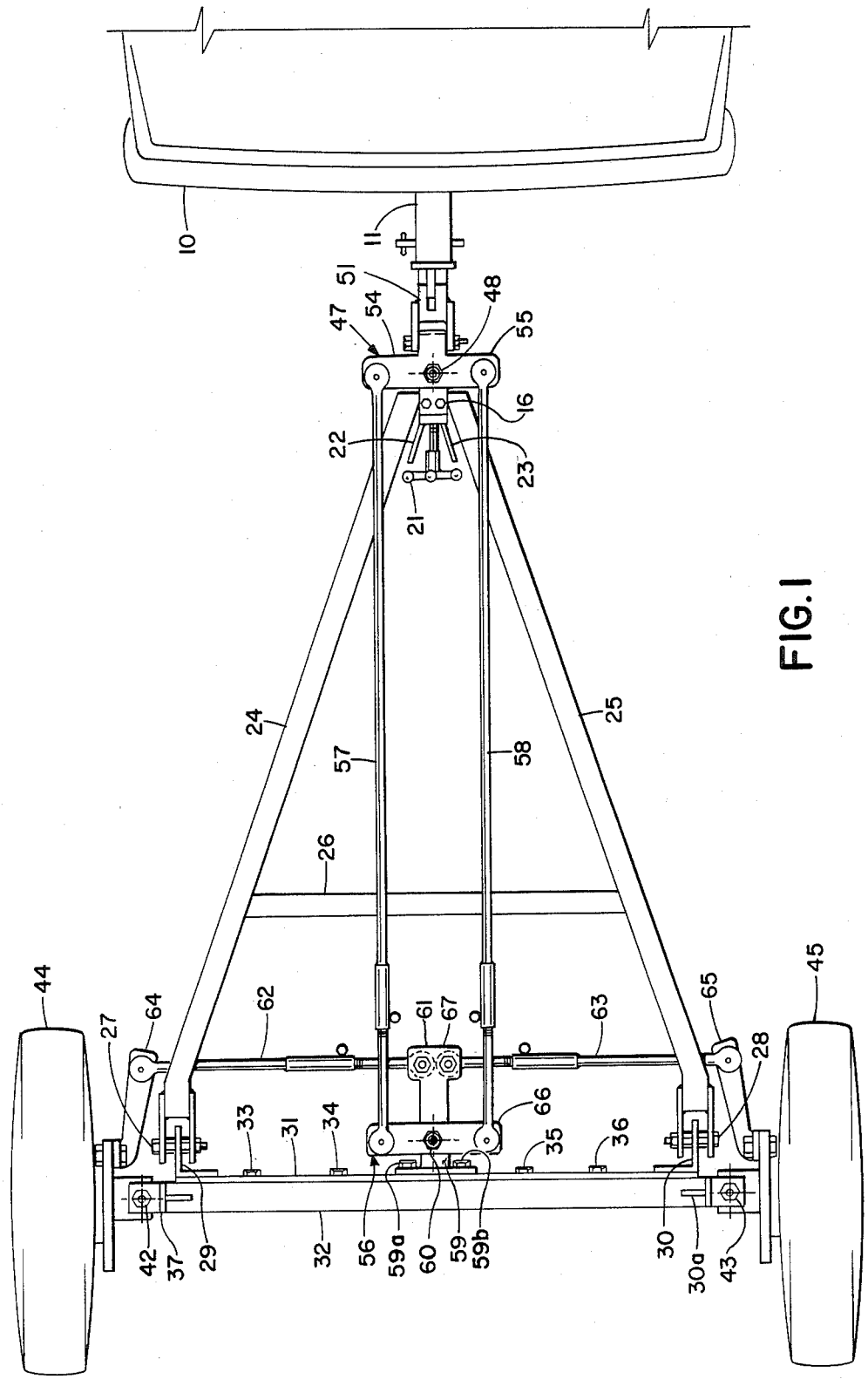
FIG. 1 is a top view showing the steering system, with the towing vehicle and the trailer aligned along the same direction of movement.

Referring to the drawings, a towing vehicle is indicated generally at 10, and is equipped with a hitch member 11. This hitch member has a short rearwardly extending beam 12 carrying the coupling ball 13. (Refer to FIG. 6). This ball is engaged by the standard coupling assembly generally indicated at 14, which includes a fixed front block 15 carried by the plates 16 and 17, and the moveable block 18 slideable in a front-rear direction under the action of the screw 19. The adjusted position of this screw can be set by the special lock nut 20. The screw is manipulated by the handle 21, and the lock nut 20 by the wings 22 and 23.

Figure 2:
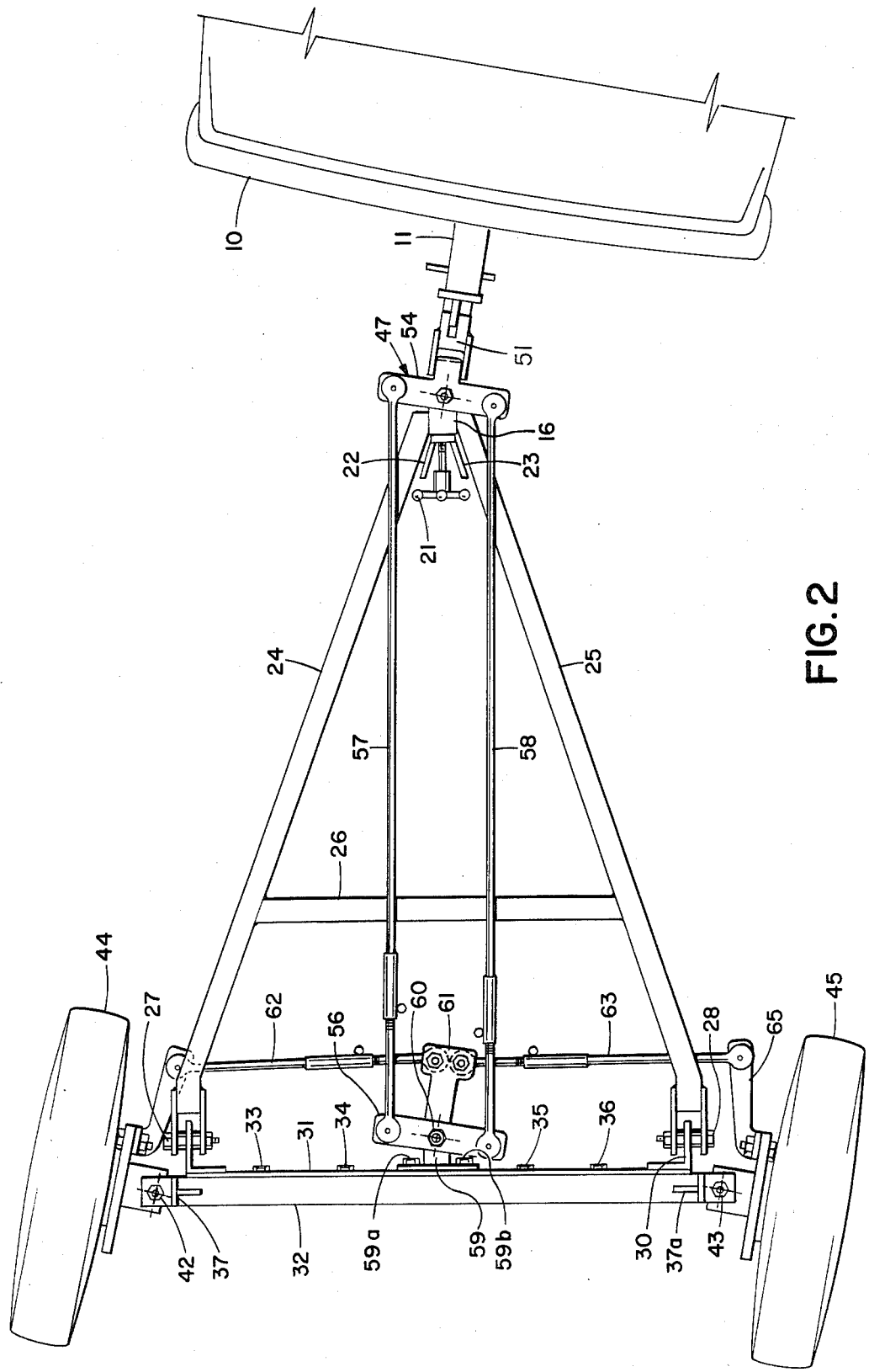
FIG. 2 shows the structure of FIG. 1, but as displaced in response to a turn by the towing vehicle.

The plates 16 and 17 are welded to the diverging beams 24 and 25 of an A-frame having the intermediate cross member 26. The rear extremitites of the beams 24 and 25 forming the legs of the A-frame are pivotally connected by bolts as shown at 27 and 28 to the brackets 29 and 30 welded to the mountng beam 31. (Refer to FIGS. 1 and 2). This beam forms an attachment to the trailer, and is secured to the transverse axle beam 32 by bolts as shown at 33–36. The front axle beam 32 is secured to the bed structure of the trailer (not shown) by the vertical columns 37 and 37a (referred to FIG. 5). The axle beam 32 has the forks 38 and 39 to which the wheel-carrying members 40 and 41 are pivotally connected on the bolts 42 and 43, respectively. Wheels at 44 and 45 are rotatably mounted on conventional stub axles as shown at 46 in FIG. 5.

The crank member 47 is pivotally mounted on the bolt 48 extending from a base flange 49 welded to the forward portion, or apex, of the A-frame formed by the junction of the legs 24 and 25. (Refer to FIG. 6). The abutment 50 extends upward from its welded junction with the hitch member 11, and receives the fork 51 pivotally mounted on the crank member 47 on the bolt 52 so that it can be swung upwardly in a clockwise direction, as viewed in FIG. 6, to disengage from the abutment 50. The offset shelf 53 of the abutment 50 limits the downward swinging movement of the fork 51. The axis of the bolt 48 preferably extends through the center of the coupling ball 13. Turning of the towing vehicle 10 with respect to the trailer will thus obviously induce a rotation of the crank member 47 about the bolt 48, due to the engagement of the fork 51 with the abutment 50. The crank member 47 also has the laterally-extending control arms 54 and 55, and the movement of the crank member 47 is transmitted to the rear crank member 56 by the link rods 57 and 58. The rear crank member is pivoted to the fulcrum 59 at the bolt 60. The rear crank member has the forwardly-extending actuating arm 61 to which the lateral links 62 and 63 are connected to associate the movement of the member 56 with the steering arms 64 and 65 that control the positions of the wheels 44 and 45. The fulcrum member 59 is bolted exclusively to the mounting beam 31 with the bolts 59a and 59b.

It is obvious that the links of the various crank arms must be carefully interrelated in order to obtain the proper relationships between a given amount of turn by the towing vehicle with an appropriate steering articulation of the wheels 44 and 45. The links 57, 58, 62, and 63 are preferably provided with the usual turnbuckle adjustments as shown so that the initial length relationships are also correctly established. It should be noted that the length of the A-frame constituting the tongue of the trailer will also affect the degree of articulation of the wheels for a given arc of turn by the towing vehicle. These relationships are all capable of theoretical analysis; but as a practical matter, are best determined by experiment. The lengths of the crank arms are easily varied by providing a plurality of holes for the pivot connections of the links so that a complete steering unit, including the A-frame and the mounting beam, can be bolted to any conventional trailer with minor adjustment accommodations. As is obvious from a glance at FIG. 1, attention must be given to removing interference between the links 57 and 58 and the laterally-extending links 62 and 63. This is best done as shown in FIG. 7, in which the rear crank member 56 is separated into two vertically-spaced sections. The upper follower arm 66 receives the front-rear links 57 and 58, and the lower actuating arm 61 receives the links extending out to the steering arms associated with the wheels. The bolt 60 is keyed to the member 66 at 68, and is welded to the member 61, so that the upper and lower sections move together. Thrust bearings as shown at 69 in FIG. 7, and at 70 in FIG. 6, are optional. The elevation of the outer extremities of the links 62 and 63 can be selected according to particular installations by the provision of the vertical adjustability provided by a plurality of holes in the vertically-extending portions 71 of the crank arms (refer to FIG. 5), and similar variation of the front-rear position of these crank arms can also be established by the provision of mounting holes in the plates 72 of the wheel-carrying members. It is obvious that any substantial degree of angularity of the links, or deviation from the right-angle relationship of the links 62-63 and 57-58 would require careful accommodation to maintain a proper steering relationship.

Another alignment requirement is the placement of the centers of the conventional ball joints connecting the links 57 and 58 to the arm 66. These must be on the axis of the pivot bolts 27 and 28 in the FIG. 1 position. Up and down movement of the front of the tongue, as the tractor and trailer mover over uneven ground, will otherwise induce a binding action that can be very destructive. In turns, the ball joints will depart from this axis, but in a compensating manner that does not induce binding.

I claim:

1. In combination with a towing vehicle having a hitch member including a coupling ball, a four-wheeled trailer having a frame and a transverse front axle beam with wheel-carrying members, each having a steering arm and pivotally mounted at the opposite ends of said beam for steering articulation, and also having tongue means extending in front of said beam and connected to said frame, said tongue means having coupling means adapted to engage said ball, wherein the improvement comprises:

a vertically-extending abutment fixed with respect to said hitch member and spaced from said ball;
   a first crank member pivotally mounted on said tongue means for articulation on a vertical axis adjacent said coupling means, said crank member having a member engageable with said abutment, and also having at least one control arm extending laterally;
   a second crank member pivotally mounted on structure normally fixed with respect to said frame for articulation on a vertical axis adjacent said axle beam, said tongue means being fixed with respect to said axle beam against relative movement about a vertical axis, and pivotally moveable with respect to said axle beam on a horizontal axis adjacent said second crank member axis, said second crank member having at least one laterally-extending follower arm, and at least one actuating arm extending in a front-rear direction;
   first link means connecting said control arm and said follower arm; and
   second link means, connecting said actuating arm and said steering arms.

2. A combination as defined in claim 1, wherein said crank members each have oppositely extending control and follower arms, respectively.

3. A combination as defined in claim 1, additionally including a mounting beam normally secured to said frame, and having central fulcrum means providing the pivotal mounting for said second crank member, and also having laterally spaced brackets providing a pivotal connection to said tongue means for movement about a transverse axis.

4. A combination as defined in claim 3, wherein said tongue means has the configuration of an "A" frame having an apex and rearwardly diverging legs, said legs being pivotally connected respectively to said brackets, and said coupling means being secured to said apex.

5. A combination as defined in claim 1, wherein said first crank member axis is coaxial with said ball.

6. In combination with a towing vehicle having a hitch member including a coupling ball, a four-wheeled trailer having a frame and a transverse front axle beam with wheel-carrying members, each having a steering arm and pivotally mounted at the opposite ends of said beam for steering articulation, and also having tongue means extending in front of said beam and connected to said frame, said tongue means having coupling means adapted to engage said ball, wherein the improvement comprises:

a vertically-extending abutment fixed with respect to said hitch member and spaced from said ball;
   a first crank member pivotally mounted on said tongue means for articulation on a vertical axis adjacent said coupling means, said crank member having a member engageable with said abutment, and also having at least one control arm extending laterally said first crank member also having a fork pivotally mounted for movement on a lateral horizontal axis, said fork being adapted to receive said abutment, and to disengage therefrom on rotation upwardly about the axis thereof;
   a second crank member pivotally mounted on structure normally fixed with respect to said frame for articulation on a vertical axis adjacent said axle beam, said tongue means being fixed with respect to said axle beam against relative movement about a vertical axis, and pivotally moveable with respect to said axle beam on a horizontal axis adjacent said second crank member axis, said second crank member having at least one laterally-extending follower arm, and at least one actuating arm extending in a front-rear direction;
   first link means connecting said control arm and said follower arm; and
   second link means, connecting said actuating arm and said steering arms.

* * * * *